United States Patent Office 2,745,825
Patented May 15, 1956

2,745,825

PROCESS FOR THE PRODUCTION OF POLYACRYLONITRILE

Heinrich Wenning, Marl, Westphalia, Germany, assignor to Chemische Werke Hüls Aktiengesellschaft, a corporation of Germany No Drawing. Application May 15, 1953,
Serial No. 355,418

Claims priority, application Germany May 27, 1952

2 Claims. (Cl. 260—88.7)

My application Ser. No. 255,567, filed November 9, 1951, now Patent Number 2,642,418 is concerned with a process for the production of polyacrylonitrile by the polymerization of the monomeric acrylonitrile in aqueous dispersion and in the presence of activators by the use of carbonic acid under superatmospheric pressure as the sole hydrogen ion donor.

It has been found that polyacrylonitrile can be made equally advantageously and with a similar yield by the polymerization of the monomeric acrylonitrile in aqueous dispersion and in the presence of activators by the use of sulfur dioxide under superatmospheric pressure as the sole hydrogen donor.

The polymerization is carried out, as in the process of the application referred to above, with the help of the usual activators such as hydrogen peroxide, redox systems such as persulfate-bisulfite mixtures, etc. The process may be carried out either continuously or discontinuously. As in the process of said prior application, the use of sulfur dioxide instead of carbon dioxide as the sole hydrogen donor, even when an excess of the sulfur dioxide is applied, never results in going beyond a critical pH value. The polyacrylonitrile produced is equally suitable for spinning for example in solution in dimethyl formamide. By releasing the sulfur dioxide pressure the polymerization may be stopped at any desired point.

In general the process of the present invention is equivalent to the process of said application including the pH value maintained but with the exception that sulfur dioxide is substituted for carbon dioxide as the hydrogen donor and the procedure described in said application may therefore be followed in carrying out the process of the present invention.

The invention is illustrated by the following.

Example 1

Sulfur dioxide is introduced into a closed vessel equipped for agitation of the contents, said vessel containing 2.2 kg. of acrylonitrile, 30 kg. of water, 11 g. of potassium persulfate and 22 g. of sodium bisulfite. The sulfur dioxide is introduced until the pressure in the vessel reaches 3 atmospheres. The contents of the vessel are warmed to 45° C. and the polymerization is continued for 6 hours. At this point polymerization is interrupted by releasing the gaseous sulfur dioxide from the vessel. The conversion of the monomer to the polymer at this point is about 70% Sulfur dioxide and monomer acrylonitrile are expelled from the reaction mixture by applying vacuum and/or raising the temperature. The resulting suspension or dispersion contains the polymer mainly as particles of about 1 micron diameter. The suspension is filtered, washed and dried and the resulting polyacrylonitrile is easily soluble in dimethyl formamide.

Example 2

Water, acrylonitrile, potassium persulfate and sodium bisulfite are continuously introduced into a closed vessel of 500 liters capacity at the rate of 100 liters of water, 7.6 kg. of acrylonitrile, 38 grams of potassium persulfate and 38 grams of sodium bisulfite per hour. At the same time sulfur dioxide is introduced at a rate sufficient to maintain the pressure thereof in the vessel at at least 2 atmospheres. The temperature within the vessel is maintained at about 45° C. Polymerization suspension is continuously withdrawn from the vessel through a standpipe. The conversion is about 70–90%.

The suspension, as in Example 1, is freed from sulfur dioxide and monomer by subjecting it to reduced pressure and/or raised temperature and is then filtered, washed and dried. The product dissolves readily in dimethylformamide.

While I have given the preferred sulfide dioxide pressure and the preferred temperature for operation of the process in the foregoing examples, I wish to state that the process may be carried out at any sulfur dioxide pressure within the range from about 1 to about 5 atmospheres and at any temperatures within the range from about 25° C. to about 70° C., whereas the pH value of the dispersion depends in each single case upon the sulfur dioxide pressure and the temperature of operation.

I claim:

1. Process for the production of polyacrylonitrile which comprises polymerizing acrylonitrile in aqueous dispersion at a temperature within the range from about 25° C. to about 75° C. under a sulfur dioxide pressure of from about 1 to about 5 atmospheres.

2. Process for the production of polyacrylonitrile which comprises maintaining an aqueous dispersion containing acrylonitrile and a water soluble redox catalyst at a temperature of about 45° C. under a sulfur dioxide pressure of from about 2 to about 3 atmospheres.

References Cited in the file of this patent

UNITED STATES PATENTS 2,462,354   Brubaker et al. _____ Feb. 22, 1949